United States Patent
Rosencrance et al.

(10) Patent No.: US 7,897,010 B2
(45) Date of Patent: *Mar. 1, 2011

(54) METHOD FOR DEINKING PULP USING PREMIXED HYDROPHOBICALLY MODIFIED CALCIUM CARBONATE PARTICLES

(75) Inventors: Scott Rosencrance, Douglasville, GA (US); Charles M. Ngome, Austell, GA (US); Kevin M. Hale, Woodstock, GA (US)

(73) Assignee: Kemira Chemicals, Inc., Kennesaw, GA (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/087,352

(22) PCT Filed: Jan. 8, 2007

(86) PCT No.: PCT/US2007/000473
§ 371 (c)(1),
(2), (4) Date: Nov. 24, 2008

(87) PCT Pub. No.: WO2007/081921
PCT Pub. Date: Jul. 19, 2007

(65) Prior Publication Data
US 2009/0165967 A1 Jul. 2, 2009

Related U.S. Application Data

(63) Continuation-in-part of application No. 11/328,485, filed on Jan. 9, 2006, now Pat. No. 7,862,685.

(51) Int. Cl.
*D21C 5/02* (2006.01)
(52) U.S. Cl. .................. 162/8; 162/4; 162/5; 162/6
(58) Field of Classification Search .................. 162/4, 5, 162/6, 7, 8
See application file for complete search history.

(56) References Cited

U.S. PATENT DOCUMENTS

| | | | |
|---|---|---|---|
| 1,451,195 A | 6/1922 | Eyrich et al. | |
| 3,357,844 A * | 12/1967 | Wood et al. ............ | 106/156.22 |
| 4,013,505 A | 3/1977 | Balcar et al. | |
| 4,231,841 A | 11/1980 | Calmanti et al. | |
| 4,360,439 A | 11/1982 | Calmanti et al. | |
| 4,421,195 A | 12/1983 | Alba | |
| 4,483,741 A | 11/1984 | Maloney et al. | |
| 4,605,773 A | 8/1986 | Maloney et al. | |
| 4,964,949 A | 10/1990 | Hamaguchi et al. | |
| 5,151,155 A | 9/1992 | Cody et al. | |
| 5,225,046 A | 7/1993 | Borchardt | |
| 5,227,019 A | 7/1993 | Borchardt | |
| 5,288,369 A | 2/1994 | Ishibashi et al. | |
| 5,336,372 A | 8/1994 | Cody et al. | |
| 5,540,814 A | 7/1996 | Curtis et al. | |
| 5,725,730 A | 3/1998 | Smolka et al. | |
| 5,736,622 A | 4/1998 | Wallberg et al. | |
| 5,801,135 A | 9/1998 | Miyauchi et al. | |
| 5,882,476 A * | 3/1999 | Evans et al. ............ | 162/7 |
| 6,013,157 A | 1/2000 | Li et al. | |
| 6,103,687 A | 8/2000 | Cody et al. | |
| 6,210,526 B1 * | 4/2001 | Pohlen ............ | 162/4 |
| 6,251,220 B1 | 6/2001 | Irinatsu et al. | |
| 6,458,343 B1 | 10/2002 | Zeman et al. | |
| 2002/0066880 A1 | 6/2002 | Robinson et al. | |
| 2002/0121347 A1 * | 9/2002 | Tello et al. ............ | 162/5 |
| 2004/0065419 A1 | 4/2004 | Lasmarias et al. | |
| 2005/0098278 A1 | 5/2005 | Rosencrance et al. | |
| 2005/0133172 A1 | 6/2005 | Robinson et al. | |
| 2007/0158039 A1 | 7/2007 | Rosencrance et al. | |
| 2007/0284067 A1 | 12/2007 | Basilio | |

FOREIGN PATENT DOCUMENTS

| | | | |
|---|---|---|---|
| EP | 0741203 | | 11/1996 |
| JP | 10088489 A | * | 4/1998 |
| WO | 94/28237 | | 12/1994 |
| WO | WO9631646 | | 10/1996 |
| WO | 2005124016 | | 12/2005 |

OTHER PUBLICATIONS

English human translation of JP-10088489A Irinatsu, 1998.*
Imerys, Precipitated Calcium carbonate, downloaded online Sep. 28, 2010.*
"Scott Rosencrance on Next-Generation Technology for the Paper Industry", Jan Bottiglieri, Tappi Journal Techlink, Paper 360, Sep. 2008.
"Not Just Your Average Pea in a Pod", Tappi Journal, Paper 360, Aug. 2008.
"Interfacial Chemistry Aspects of De-Inking Flotation of Mixed Office Paper", Drelich et al.; Paper presented at the Annual Meeting of the Society of Mining, Metallurgy and Exploration, in Denver, Colorado during Feb. 26-28, 2001.
"Advances in Deinking Surfactant chemistry for Onp/Omg Systems", Horeck & Luo; Paper Age Magazine, Jul. 2001 issue.

* cited by examiner

*Primary Examiner* — Eric Hug
*Assistant Examiner* — Anthony J Calandra

(57) ABSTRACT

The present invention provides methods for deinking printed waste paper—particularly methods that use a deinking composition that includes a hydrophobically-modified inorganic particle ("MIP") to improve ink collection efficiency under traditional alkaline, reduced alkali, and true neutral deinking conditions. Deinking compositions are provided that include a hydrophobically-MIP substrate, a nonionic surfactant, and a fatty acid, or mixtures thereof. The improved ink collection of the present invention can result in deinked pulp of high quality and/or yields that has excellent brightness and effective residual ink concentrations ("ERIC") values.

18 Claims, No Drawings

METHOD FOR DEINKING PULP USING PREMIXED HYDROPHOBICALLY MODIFIED CALCIUM CARBONATE PARTICLES

RELATED APPLICATIONS

This application is a continuation in part of, and claims priority to, U.S. Ser. No. 11/328,485, filed Jan. 9, 2006 now U.S. Pat. No. 7,862,685.

FIELD OF THE INVENTION

The present invention relates to methods for deinking printed waste paper. More particularly, the present invention relates to the use of hydrophobically-modified inorganic substrates as ink collectors to produce deinked pulp of high quality and in high yields during the deinking process. Relevant patent class numbers may include 162 (Paper making and fiber liberation), 510 (Cleaning compositions for solid surfaces, auxiliary compositions therefore, or processes of preparing the compositions), 106 (Compositions: coating or plastic), and/or 210 (Liquid purification or separation).

BACKGROUND OF THE INVENTION

The paper industry has been practicing waste paper recycling to regenerate usable cellulosic fiber for paper making for many decades. In these processes, ink is removed from the waste paper pulp using a suitable deinking composition. By controlling the deinking process, a recycling mill can affect the properties of the paper such as the brightness and can improve the usability of the cellulosic fiber for paper manufacturing.

Deinking consists of a series of complex chemical and physical processes. These events include but are not limited to ink detachment, ink dispersion, ink collection, ink transport, and removal of inks from the waste paper pulp slurry. Each of these microprocesses have different surface and interfacial demands within the recycling operation in order to efficiently and effectively deink waste paper and produce quality paper.

Conventionally, two different methods have been employed to isolate the ink and ink related entities in order to produce the deinked fiber after repulping. These two processes are flotation and wash deinking. Often, processes contain both flotation and wash deinking and can be referred to as combination deinking processes. The underlying chemical and physical requirements to successfully deink are different for wash, flotation, and combination deinking processes.

More specifically, flotation/washing combination deinking refers to a deinking process wherein the ink released by the deinking composition is separated from the cellulosic fibers primarily through the flotation devices or flotation cells of the recycling process prior to passing the pulp through washing stages. Alternatively, washing/flotation combination deinking refers to a deinking process wherein the ink released by the deinking composition is separated from the cellulosic fibers primarily through the washing devices of the recycling process prior to passing the pulp through flotation stages. Wash deinking, on the other hand, refers to a deinking process wherein the ink released by the deinking composition is separated from the cellulosic fibers in the washing stages.

Flotation processes are fundamentally different than washing processes. This difference is partly because the ink size and hydrophobicity are important for favorable separation. Flotation methods of ink removal generally involve passing air bubbles through an aqueous system containing dispersed cellulose fiber that is most often produced via a repulping process. The resulting repulped cellulose fiber slurry having therein additives added either before, during, or after repulping. As the air bubbles rise within the fiber slurry and carry the ink particles with them, they generate foam which is enriched in ink that is subsequently removed from the flotation cell. The amount of foam that is typically favored in flotation deinking systems is an amount which can be collected by skimming, decanting, or other means, and which transports with it an enriched concentration of ink while minimizing the amount of other solids such as fibers that are rejected.

Flotation deinking usually utilizes different surfactants than washing because the resulting surface properties and size of the ink particles that is beneficial for flotation deinking is different than is desirable for wash deinking. Examples of traditional nonionic surfactants that may be used in the flotation deinking process include alkylene oxide adducts of fatty alcohols, alkylphenols, fatty acids, and alkanolamides. Such nonionic surfactant deinking agents may be used either by themselves or in combination with one another and can also be blended with nonalkoxylated fatty acids and fatty alcohols. Flotation deinking has historically relied on a high pH pulping liquor to remove ink from the fiber and facilitate efficient usage of pulper bleach additives.

Wash deinking typically requires fine dispersion of ink. The ink and fiber are uniformly distributed throughout the slurry, and foaming or bubble formation, though present, is not particularly desired. The objective in the washing process is to release the ink from the fiber into an aqueous medium and then separate the fiber from the aqueous medium. Thus, the washing method comprises repulping, preferably under low-foaming conditions, of secondary fiber in an ink-removing aqueous medium whereby the ink (and other non-cellulosic contaminants, if present) is mechanically and/or chemically removed as desired from the fiber. The repulping step is typically followed by dilution and/or screening. Certain surfactants are known to those skilled in the art to modify interfacial properties successfully for wash deinking. These surfactants, however, also modify the ink into a hydrophilic dispersed state that favors the washing method.

Washing and flotation processes both depend on the proper use of surfactant. Depending on the relative contributions and characteristics of the hydrophilic and hydrophobic portions of the surfactant molecule, the surfactant's interaction with the ink will vary as ink particles will be rendered either hydrophilic for washing purposes or more hydrophobic for flotation. The opposing natures of wash surfactant and flotation surfactant can lead to inefficiency in combination deinking systems. The deinking mechanism for washing is quite different from that for flotation and, therefore, they require the use of deinking compositions having different properties.

Typically, either a flotation-derived or washing-derived deinking chemistry is utilized in a given deinking system. At some point in either process, the deinked, repulped waste paper is often passed through a series of fine cleaners and/or screens where the small particulate contaminants (e.g., sand and grit) are removed. Additional processing stages may be required such as, for example, dispersion, to reduce the particle size of any contaminants, or a special cleaning stage with special cleaners designed to remove specific contaminants.

The chemistry involved in traditional deinking very often involves addition of caustic soda in the repulper to increase the pH, often greater than 9 and sometimes greater than 10. Increasing the pH, however, often causes yellowing and darkening of the waste paper stock—especially when the waste paper contains groundwood or mechanical pulps. To counteract this undesirable darkening effect, a bleaching additive is typically added to increase the whiteness and brightness of to the pulp. The deinked waste paper is then held in storage until it is eventually fed to a papermaking machine.

Surfactant-based deinking aids, especially nonionic surfactants, can be excellent ink detachment agents. Some nonionic surfactants assist in ink collection. If not properly chosen, however, these additives can also actually hinder ink collection in flotation containing processes. It is well known that traditional fatty acid soaps are efficient ink collectors in alkaline systems (pH greater than 9), although these soaps can demonstrate decreased ink detachment characteristics and lead to deposit concerns later in the process.

Because of the relatively low deinking collection efficiency and high cost of various deinking aids, many paper mills have become technically and/or economically motivated to explore new deinking programs. One such solution for improved deinking performance is obtained by using a blend of fatty acid soaps and nonionic surfactants. These blends are often found to demonstrate superior performance in deinking waste paper slurries. These blends often lead to a lower consumption of fatty acid soaps and are useful for mills that are technically or economically motivated to use less or no soap.

Rheox Inc., in a series of patents, have described the modification of various clays using cationic species for waste paper deinking. See, e.g., U.S. Pat. Nos. 5,151,155, 5,389,200, 5,336,372, 5,759,938, 5,696,292 and 5,634,969. The patents are focused primarily on the use of modified smectites containing a large amount of silicon species. The authors report modification of these smectites by adsorbing quaternary species onto the smectite surfaces before introducing the modified clay to the deinking system.

Strategies for improved collection efficiency, however, depend on factors other than the deinking chemistry. Specifically, the collection efficiency is strongly influenced by the type of recovered paper raw material and printing method. In old newsprint ("ONP")-containing systems the deinking chemistry is crucial to determining the collection efficiency and ultimately the ink removal and final deinking pulp quality.

There is a need for a more efficient and cost effective method to collect ink during the process of deinking waste paper.

There is also a need for a method that produces paper pulp that has both excellent brightness and low effective residual ink concentrations ("ERIC").

There is also a need for a method that improves final paper pulp quality and paper pulp yield during flotation/washing combination and wash deinking processes.

There is also a need for improved ink collection and removal in reduced alkali and/or neutral conditions.

SUMMARY OF THE INVENTION

The present invention provides methods for deinking printed waste paper that improves ink collection efficiency under traditional alkaline, reduced alkali, and true neutral deinking conditions. The improved ink collection of the present invention can result in deinked pulp of high quality and/or yields that has excellent brightness and ERIC values.

The present invention comprises a method of deinking printed waste paper that comprises ink and paper pulp, comprising the steps of converting the printed waste paper to an aqueous pulp slurry in a pulper; contacting said aqueous pulp slurry with an inorganic substrate; contacting said aqueous pulp slurry with a deinking composition which comprises a nonionic surfactant, a fatty acid, or a mixture thereof; separating said ink in the aqueous pulp slurry; and recovering deinked paper pulp from the aqueous pulp slurry; wherein said deinking composition is optionally mixed with said inorganic substrate prior to contacting said aqueous pulp slurry.

The present invention further comprises a method of preparing a deinking additive comprising providing from about 1 to about 40 weight parts calcium carbonate in a powder, cake, or slurry; providing about 1 weight part of a deinking composition comprising a nonionic surfactant, a fatty acid, or a mixture thereof; and mixing said calcium carbonate and said deinking composition to obtain said deinking additive.

These and other features and advantages of the present invention will become more readily apparent to those skilled in the art upon consideration of the following detailed description, which describes both the preferred and alternative embodiments of the present invention.

DETAILED DESCRIPTION OF THE INVENTION

The present invention provides methods for deinking printed waste paper. The present invention further provides a deinking composition that includes a hydrophobically-modified inorganic particle ("MIP") to improve collection efficiency during the deinking process under traditional alkaline, reduced alkali, and true neutral deinking conditions. Deinking compositions are provided that comprise a hydrophobically-MIP, a nonionic surfactant, and a fatty acid, or mixtures thereof.

DEFINITIONS

The term "alkyl", as used herein, unless otherwise specified, includes saturated straight, branched, or cyclic, primary, secondary, or tertiary hydrocarbon, e.g. C1 to C20 or C6 to C20, specifically including methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group may also include tri-decyl. The alkyl group can be optionally substituted with one or more moieties selected from the group consisting of hydroxyl, carboxy, carboxamido, carboalkoxy, acyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991, hereby incorporated by reference.

In the text, whenever the term C(alkyl range) is used, the term independently includes each member of that class as if specifically and separately set out. As a non-limiting example, the term "C1 to C20" independently represents each species that falls within the scope, including, but not limited to, methyl, ethyl, propyl, isopropyl, butyl, sec-butyl, iso-butyl, tert-butyl, pentyl, iso-pentyl, neo-pentyl, cyclopentyl, cyclopentyl, hexyl, 1-methylpentyl, 2-methylpentyl, 3-methylpentyl, 4-methylpentyl, 1-ethylbutyl, 2-ethylbutyl, 3-ethylbutyl, 4-ethyl butyl, cyclohexyl, heptyl, 1-methylhexyl, 2-methylhexyl, 3-methylhexyl, 4-methylhexyl, 5-methylhexyl, 6-methylhexyl, 1 ethylpentyl, 2-ethylpentyl, 3-ethylpentyl, 4-ethylpentyl, 5-ethylpenyl, 1-propylbutyl, 2-propylbutyl, 3-propybutyl, 4-propylbutyl, cycloheptyl, octyl, 1-methylheptyl, 2-methylheptyl, 3-methylheptyl, 4-methylheptyl, 5-methylheptyl, 6-methylheptyl, 7-methylheptyl, 1-ethylhexyl, 2-ethylhexyl, 3-ethylhexyl, 4-ethylhexyl, 5-ethylhexyl, 6-ethylhextyl, 1-propylpentyl, 2-propylpentyl, 3-propypentyl, 4-propylpentyl, 5-propylpentyl, cyclooctyl, nonyl, cyclononyl, or cyclodecyl.

The term "HLB," as used herein, refers to the "hydrophilic-lipophilic balance" of a molecule. The HLB number generally falls in the range of 1-40, with the most commonly used materials having a value between 1 and 20. The HLB number increases with increasing hydrophilicity. The HLB system is a semi-empirical method to predict what type of surfactant properties a molecular structure will provide. The HLB system is based on the concept that some molecules have hydrophilic groups, other molecules have lipophilic groups, and some have both. The HLB of a surfactant can be calculated according to Griffin W C: "Classification of Surface-Active Agents by 'HLB,'" Journal of the Society of Cosmetic Chemists 1 (1949): 311; and Griffin W C: "Calculation of HLB Values of Nonionic Surfactants," *Journal of the Society of Cosmetic Chemists* 5 (1954): 259.

The term "fatty acid," as used herein, means a composition comprising a fatty acid of a uniform molecular weight—or a mixture of fatty acids having a distribution of molecular weights.

The term "fatty alcohol," as used herein, means a composition comprising a fatty alcohol of a uniform molecular weight—or a mixture of fatty alcohols having a distribution of molecular weights.

The term "#/t," as used herein, means pound(s) per ton of dried solids present in the aqueous pulp slurry. A ton is equivalent to 2000 pounds.

The terms "printed waste paper" or "waste paper," as used herein, mean newsprint, magazines, telephone directories, printed advertising materials, laser printed materials, computer paper, legal documents, book stock, corrugated containers, or a mixture thereof.

The term "effective residual ink concentration ("ERIC")," as used herein, means a value that is a measure of the effect of the remaining ink—or the overall darkening effect of the residual ink. The lower the ERIC value, the lower the amount of residual ink on the fiber. A lower ERIC value, therefore, is an indication of increased deinking performance. The ERIC value is conventionally used by mills, research facilities, and product development facilities to determine ink retention in paper sheet.

The term "mixture," as used herein, means a heterogeneous association of substances which cannot be represented by a chemical formula. Its components may or may not be uniformly dispersed.

The term "mix," as used herein, means effecting a uniform dispersion of liquid, semi-solid, or solid ingredients of a mixture by means of mechanical agitation.

The term "blend," as used herein, means a mixture so combined as to render the parts indistinguishable from one another.

The terms "oxyethylene," "ethylene oxide," or "EO," as used herein, mean an ethyl moiety attached to an oxygen moiety, or —O—CH2CH2-.

The terms "oxypropylene," "propylene oxide," or "PO," as used herein, mean a propyl moiety attached to an oxygen moiety, or —O—CH2CH(CH3)-.

The term "weight percent," or "wt. %," as used herein, means the dry weight of untreated MIP divided by the total weight of the solution (untreated MIP+water) and multiplied by 100.

In the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

DISCUSSION

The present invention provides methods for deinking printed waste paper pulp that produce deinked pulp of high quality and/or yields having excellent brightness and ERIC values. The deinking methods may be used across a wide spectrum of recycled printed waste paper and processing conditions.

The present invention further provides deinking compositions that typically comprise a hydrophobically-MIP, a nonionic surfactant, and a fatty acid, or mixtures thereof. The deinking compositions provided by the present invention enhance ink separation at different pHs, water hardness levels, and temperatures over conventional deinking compositions.

The present invention comprises a method of deinking printed waste paper that comprises ink and paper pulp, comprising the steps of converting the printed waste paper to an aqueous pulp slurry in a pulper; contacting said aqueous pulp slurry with an inorganic substrate; contacting said aqueous pulp slurry with a deinking composition which comprises a nonionic surfactant, a fatty acid, or a mixture thereof; separating said ink in the aqueous pulp slurry; and recovering deinked paper pulp from the aqueous pulp slurry; wherein said deinking composition is optionally mixed with said inorganic substrate prior to contacting said aqueous pulp slurry.

The deinking method of the invention is generally conducted by pulping printed waste paper materials in the presence of the deinking composition in a vessel that is commonly known in the art as a "pulper" or "repulper." Pulping is normally conducted under a specific set of conditions including temperature, pH, and water hardness. The present invention includes a method of deinking printed waste paper comprising the step of converting the printed waste paper to an aqueous pulp slurry in a pulper. The converting step occurs at a temperature ranging from about 25° C. to about 85° C. In one preferred embodiment of the invention, the converting step occurs at a temperature ranging from about 30° C. to about 75° C. More preferably, the converting step occurs at a temperature ranging from about 40° C. to about 60° C. In another preferred embodiment of the invention, the aqueous pulp slurry comprises from about 5% to about 35% printed waste paper pulp by weight. More preferably, the aqueous pulp slurry comprises from about 5% to about 25% printed waste paper pulp by weight. This is often referred to as "pulping consistency"—which is a term used in the paper industry to describe the concentration (w/v) of an aqueous slurry of pulp fibers.

The aqueous slurry may further comprise caustic or soda ash, a nonionic surfactant, a chelant, a peroxide, or a silicate, a fatty acid, or mixtures thereof. Preferably, concentrations of a sodium hydroxide or a soda ash range from about 0 pounds/ton of printed waste paper to about 40 pounds/ton of printed waste paper being deinked. Alternatively or in addition, concentrations of nonionic surfactant and/or fatty acids range from about 0.5 pounds/ton of printed waste paper to about 20 pounds/ton of printed waste paper being deinked. In another preferred embodiment of the invention, concentrations of a chelant range from about 0 pounds/ton of printed waste paper to about 6 pounds/ton of printed waste paper being deinked. In yet another preferred embodiment of the invention, concentrations of a peroxide range from about 0 pounds/ton of printed waste paper to about 40 pounds/ton of printed waste paper being deinked. In still another preferred embodiment of the invention, concentrations of a silicate range from about 0 pounds/ton of printed waste paper to about 45 pounds/ton of printed waste paper being deinked.

After the pulping step, the pulped aqueous slurry may be subjected to cleaning, screening, and washing stages where ink and other contaminants are separated from the cellulosic fiber stream. The deinked pulp may also be subsequently thickened and bleached to the target brightness prior to being sent to the paper machine where supplements—such as strength aids, drainage aids, and/or paper sizing agents—may be added. In general, paper is produced that meets certain specifications—including brightness, count, strength, size (water repellency), and/or water absorbency levels.

The present invention further comprises a method of deinking printed waste paper comprising contacting the aqueous pulp slurry with an inorganic substrate or particle. A hydrophobically-MIP of the present invention improves collection efficiency during the deinking process under traditional alkaline, reduced alkali, and true neutral deinking conditions. More preferably, a hydrophobically-MIP comprises calcium carbonate. For the present invention, the inorganic class of calcium carbonates was selected as a non-limiting representative of potential hydrophobically-MIP substrates.

Inorganic particles that may be used include practically any inorganic salt that is substantially insoluble under deinking conditions. Suitable cationic elements for the inorganic particles thus include, for example, calcium, magnesium, lithium, barium, aluminum, zinc, copper, titanium, manganese, strontium and iron. Exemplary salts may be formed when an acidic proton present on the metal is capable of reacting with an inorganic base. Acceptable inorganic bases include sodium hydroxide, sodium carbonate, potassium hydroxide, aluminum hydroxide and calcium hydroxide. Exemplary salts also include acid addition salts formed with inorganic acids such as hydrochloric acid, hydrobromic acid, sulfuric acid, nitric acid, phosphoric acid, and the like. The anionic component of the inorganic particle thus may be selected from carbonate, oxide, oxalate, peroxide, hydroxide, hydride, borate, nitrate, phosphate, silicate, sulfate, carbonate, perchlorate, aluminate, sulfide, and acetates ions, among others.

A critical requirement of the inorganic particle is its ability to remain in a particulate state in a deinking bath. Therefore, the particle must have little or no solubility under the conditions under which deinking is typically practiced. In particular embodiments, the inorganic particle has a solubility in water of less than 10 wt. %, 5 wt. %, 1 wt. %, or even 0.1 wt. % when measured under any or all of the foregoing conditions: (i) 25° C. and 7.5 pH, (ii) 50° C. and 7.5 pH, (iii) 75° C. and 7.5 pH, (iv) 25° C. and 8.5 pH, (v) 50° C. and 8.5 pH, (vi) 75° C. and 8.5 pH, (vii) 25° C. and 9.5 pH, (viii) 50° C. and 9.5 pH, and (ix) 75° C. and 9.5 pH.

In one embodiment of the present invention, the inorganic particle is calcium carbonate that comprises precipitated crystalline calcium carbonate. In a preferred embodiment of the present invention, the calcium carbonate comprises precipitated calcium carbonate ("PCC") having a scalenohedral morphology. In another embodiment of the present invention, the calcium carbonate comprises ground calcium carbonate. In yet another embodiment of the present invention, the calcium carbonate or inorganic particle is provided as a powder, cake, or aqueous slurry. More preferably, the calcium carbonate or inorganic particle is provided substantially in the absence of any dispersants.

In one embodiment, the inorganic particle is not a silicon containing material. While some silicon may be present in the inorganic particle, the particle preferably comprises no more than 15 wt. %, 10 wt. %, 5 wt. % or 1% silicon based on the weight of silicon (based on an elemental calculation).

In one embodiment of the present invention, the calcium carbonate or inorganic particle comprises particles having an average particle diameter of from about 0.1 microns (μm) to about 50.0 microns (μm). In one preferred embodiment of the present invention, the calcium carbonate or inorganic particle comprises particles having an average particle diameter of from about 0.2 microns (μm) to about 3.0 microns (μm).

In one embodiment of the present invention, the calcium carbonate or inorganic particle dosage is from about 1 pound/ton printed waste paper being deinked to about 75 pounds/ton printed waste paper being deinked. In one preferred embodiment of the invention, the calcium carbonate or inorganic particle dosage is from about 5 pounds/ton printed waste paper being deinked to about 40 pounds/ton printed waste paper being deinked. More preferably, the calcium carbonate or inorganic particle dosage is from about 10 pounds/ton printed waste paper being deinked to about 30 pounds/ton printed waste paper being deinked.

The present invention further includes a method of deinking waste paper comprising the steps of contacting printed waste paper pulp with the deinking composition (discussed below). In one preferred embodiment of the present invention, the contacting step occurs during a period of from about 1 minute to about 120 minutes. More preferably, the contacting step occurs during a period of from about 4 minutes to about 90 minutes. In multiple embodiments of the present invention, the printed waste paper pulp is contacted with the deinking composition at a pH of from about 6.5 to about 11.5, at a pH of from about 8.8 to about 11.5, at a pH of from about 7.2 to about 9.0, or at a pH of from about 6.8 to about 7.8. In one preferred embodiment of the invention under traditional alkaline deinking conditions, the pH of the contacting step ranges from about 9.0 to about 11.0. In one preferred embodiment of the invention under reduced alkali deinking conditions, the pH of the contacting step ranges from about 7.5 to about 8.8. In one preferred embodiment of the invention under true neutral deinking conditions, the pH of the contacting step ranges from about 6.8 to about 7.5. In another preferred embodiment of the invention, the aqueous pulp slurry comprises less than 1 pound/ton of printed waste paper of dispersants after the contacting step. More preferably, the aqueous pulp slurry does not contain any dispersants after the contacting step. The resulting printed waste paper pulp can be used to make paper having excellent brightness and ERIC values.

The present invention comprises a method of deinking printed waste paper further comprising contacting the aqueous pulp slurry with a deinking composition comprising a nonionic surfactant, a fatty acid, or a mixture thereof.

In addition to the deinking composition of the invention, additional chemicals may be added to the pulper such as sodium hydroxide or soda ash to control the pH of the composition in the pulper. Alkali metal phosphates and silicates may also be added to modify the properties of the composition in the pulper.

The present invention comprises a method for deinking waste paper that includes a deinking composition comprising a fatty acid. A fatty acid can have varying levels of saturation as indicated by iodine values of between 0-300 and degrees of ethylenic unsaturation. The preferred iodine value is greater than zero. The preferred degree of ethylenic unsaturation is from about 1 to about 5. In another embodiment of the present invention, the fatty acid is saturated. The fatty acids have a carbon chain length of from about C6 to about C22, and preferably of from about C14 to about C18, and can be selected from the group consisting of lauric acid, oleic acid, stearic acid, tall oil fatty acid, tallow oil fatty acid, vegetable oil fatty acid, palm oil fatty acid, coconut oil fatty acid, and mixtures thereof. The fatty acid is preferably derived from palm, tall, vegetable, or tallow oils.

The present invention comprises a method for deinking waste paper that includes a deinking composition comprising a nonionic or anionic surfactant. The nonionic and anionic surfactants of the present invention can potentially impact deinking efficiency by (1) enhancing release of the printed inks from the cellulosic fiber, (2) stabilizing the released inks in the aqueous phase to prevent them from depositing back onto the fiber, and (3) allowing the stabilized ink to be separated from the fiber. Therefore, the nonionic surfactants used in the deinking composition of the invention have a positive effect on the resulting paper product—as demonstrated by an unexpected increase in paper brightness and decrease in ERIC values over conventional deinking compositions that use conventional deinking surfactants.

In one preferred embodiment of the invention, the nonionic surfactant can comprise either an ethoxylated hydrocarbon or an alkoxylated hydrocarbon. In one embodiment of the present invention, a nonionic surfactant comprises an alkoxylated hydrocarbon. Preferably, a nonionic surfactant comprises an alkoxylated hydrocarbon comprising from about 1 to about 100 moles of alkoxylation. More preferably, a nonionic surfactant comprises an alkoxylated hydrocarbon comprising from about 5 to about 50 moles of alkoxylation. In one preferred embodiment of the present invention, a nonionic surfactant comprises an alkoxylated fatty acid, fatty alcohol, or castor oil. In another embodiment, a nonionic surfactant comprises a first surfactant that is ethoxylated and a second surfactant that is ethoxylated and propoxylated, wherein the propoxylation and ethoxylation in the second nonionic surfactant is random or blocked. Where the alcohols are to be randomly ethoxylated and propoxylated, the desired amounts of ethylene oxide and propylene oxide can be added together to the alcohol mixture. Alternatively, where the alcohols are to include block ethoxylation and propoxylation, the desired amount of one of ethylene oxide and propylene oxide is added first to the alcohol mixture and allowed to react with the alcohol—followed by the addition of the other alkylene oxide.

The ratio of ethoxylated hydrocarbon to propoxylated/ethoxylated hydrocarbon ranges from about 100:0 to about 0:100. Preferably, the ratio of ethoxylated hydrocarbon to propoxylated/ethoxylated hydrocarbon ranges from about 3:0 to about 0:3. The hydrophobe length of these alkoxylates can vary depending on whether the fatty alcohol is branched or linear. In one preferred embodiment of the invention, a nonionic surfactant comprises a branched ethoxylated fatty alcohol comprising a C6-C18 hydroprobe, or a linear ethoxylated fatty alcohol comprising a C10-C22 hydroprobe. More preferably, a nonionic surfactant comprises an ethoxylated hydrocarbon and an alkoxylated hydrocarbon. The ratio of ethoxylated hydrocarbon to alkoxylated hydrocarbon ranges from about 0:100 to about 100:0. Preferably, the ratio of ethoxylated hydrocarbon to alkoxylated hydrocarbon ranges from about 1:3 to about 3:1.

In another embodiment, a nonionic surfactant can comprise an alkoxylated fatty acid, fatty alcohol, or castor oil. The alkoxylated fatty acid, which can be a mixture of various fatty acids, can range from about 1 wt. % to about 99 wt. % with the preferred range being from about 15 wt. % to about 85 wt. %. The alkoxylated fatty alcohol can range from about 1 wt. % to about 99 wt. % with the preferred range being from about 15 wt. % to about 55 wt. %. The other surfactants in the blend may comprise fatty acids, fatty alcohols, and/or oils of which one or more may be alkoxylated and the total amount can range from about 1 wt. % to about 50 wt. %. Water or other diluents can be added to the above combinations to achieve a 100% by weight formulation with the preferred amounts ranging from about 0 wt. % to about 25 wt. %. In this scenario, the flotation additive is optional and, if used, may contain a cationic polymer from about 1 wt. % to about 99 wt. % with a preferred range of from about 5 wt. % to about 50 wt. %. The blend may also contain a mixture of surfactants ranging from about 1 wt. % to about 99 wt. % and in tandem with the appropriate amount of water to constitute 100 wt. %.

Non-limiting examples of nonionic surfactants include ether type, ether ester type, ester type, nitrogen-containing type, polyhydric alcohol, amino alcohol, and polyethylene glycol.

Specific non-limiting examples of nonionic surfactants include polyoxyethylene adducts such as alkylpolyoxyethylene ethers, alkylpolyoxyethylenes, polyoxypropylene ethers, fatty acid polyoxyethylene esters, fatty acid polyoxyethylene sorbitan esters, fatty acid polyoxyethylene sorbitol esters, polyoxyethylene castor oils, and alkylpolyoxyethylene amines, and amides; polyhydric alcohols and alkylol amides such as fatty acid sorbitan esters, fatty acid polyglycerin esters and fatty acid sucrose esters, silicone-base surfactants such as polyethers-modified, alkylaralkylpolyether-modified, epoxypolyether-modified, alcohol-modified, fluorine-modified, amino-modified, mercapto-modified, epoxy-modified, or allyl-modified silicone-base surfactants; and fluorine-base surfactants such as perfluoroalkylethylene oxide adduct. The above-exemplified nonionic surfactants can be used in combination.

In addition, the compositions of the invention are preferably "NPE-free"—that is, they are free of nonylphenol ethoxylates.

Preferably, the deinking composition contains at least one fatty acid and at least one nonionic surfactant. More preferably, the deinking composition contains at least one fatty acid and at least two nonionic surfactants. The nonionic surfactant and the fatty acid are present at a preferred weight ratio of from about 1:5 to about 5:1, from about 1:3 to about 3:1, or from about 1:2 to about 2:1.

The deinking method uses a deinking composition comprising from about 5 to about 75 wt. % nonionic surfactant and from about 5 to about 95 wt. % fatty acid. Preferably, the deinking composition comprises from about 10 to about 65 wt. % nonionic surfactant and from about 10 to about 90 wt. % fatty acid. More preferably, the deinking composition comprises from about 15 to about 55 wt. % nonionic surfactant and from about 15 to about 85 wt. % fatty acid.

The fatty acid and/or nonionic surfactant deinking composition blend is typically provided from about 2 pounds/ton of printed waste paper being deinked to about 30 pounds/ton, or from about 5 pounds/ton of printed waste paper being deinked to about 20 pounds/ton, of printed waste paper being deinked.

The hydrophobically-MIP, fatty acid, and nonionic surfactant, or mixtures thereof, can be added separately to the pulper or mixed together prior to adding the mixture to the pulper. Preferably, the hydrophobically-MIP, fatty acid, and nonionic surfactant, or mixtures thereof, are mixed prior to being added to the pulper.

The ratio of inorganic particle to deinking composition can range from about 1:2 to about 40:1. Preferably, the ratio of inorganic particle to deinking composition ranges from about 1:1 to about 15:1. More preferably, the ratio of hydrophobically-MIP to deinking composition ranges from about 1:1 to about 10:1.

While fatty acids and nonionic surfactants are commonly used as additives to deink printed waste paper, it has unexpectedly been discovered that a hydrophobically-MIP provides a synergistic and non-additive benefit in flotation and washing deinking processes when the deinking composition contains a mixture of fatty acids and nonionic surfactants in specific ratios. Surprisingly, it has also been discovered that a hydrophobically-MIP, a fatty acid, and a nonionic surfactant, or a mixture thereof, deinking composition can remove ink from a printed waste paper slurry under traditional alkaline (pH of from about 9.0 to about 1.0), reduced alkaline (pH of from about 7.5 to about 8.8), or true neutral (pH of from about 6.8 to about 7.5) deinking conditions. The deinking compositions of the invention can thus substantially reduce the costs and effort associated with pH adjustment during and after deinking in the paper manufacturing process as well as reduce or eliminate detrimental effects associated with traditional alkaline deinking such as alkaline yellowing or darkening. Further, the deinking composition of the present invention unexpectedly produces paper pulp having increased brightness and significantly decreased ERIC values.

The present invention provides that the deinking composition is optionally mixed with the inorganic substrate prior to the contacting steps.

The present invention further provides that the contacting steps occur in the pulper.

The present invention further includes a method of deinking waste paper comprising the step of separating the printed waste paper pulp from the ink in the aqueous pulp slurry. Different methods are employed to isolate the ink and ink related entities in order to produce the deinked fiber after repulping—namely, flotation, washing/flotation combination, flotation/washing combination and wash deinking.

The present invention further includes a method for deinking waste paper comprising the step of recovering deinked paper pulp from the aqueous pulp slurry. The recovering step comprises a flotation step, a washing step, or a combination thereof. One preferred embodiment of the invention comprises a flotation step. The flotation step comprises a deinking additive comprising from about 1 to about 40 weight parts calcium carbonate in a powder, cake, or slurry; from about 1 weight part of a deinking composition comprising a nonionic surfactant, a fatty acid, or a mixture thereof; and mixing the calcium carbonate and the deinking composition to obtain the flotation deinking additive.

Printed waste paper comprises newsprint, magazines, telephone directories, printed advertising materials, laser printed materials, computer paper, legal documents, book stock, corrugated containers, tacky contaminants, or a mixture thereof. The printed waste paper comprises from about 20% to about 100% by weight newsprint. In one preferred embodiment of the invention, the printed waste paper comprises from about 50% to about 100% by weight newsprint. More preferably, the printed waste paper comprises from about 80% to about 100% by weight newsprint. In another embodiment, the printed waste paper comprises magazines in an amount of up to about 80% by weight. Preferably, the printed waste paper comprises magazines in an amount of up to about 50% by weight. More preferably, the printed waste paper comprises magazines in an amount of up to about 20% by weight.

The paper fibers used to produce these materials may be chemically pulped materials, such as Kraft pulps, or may be mechanical produced pulps, such as groundwood or mixtures thereof. Such waste paper may also contain adhesive or tacky contaminants.

Adhesive or tacky contaminants that are often found in waste paper include pressure sensitive tape (e.g., acrylic contact adhesives), polyester hotmelt adhesive tape, seam bindings, labels, decals, stamps, and stickers (e.g., bumper stickers). These adhesives are often referred to as "stickies" in the paper making art. Stickies are a diverse mixture of synthetic polymeric organic materials. During the pulping process, stickies are liberated from secondary fiber due to the applied mechanical and thermal energy. Stickies do not disperse well in water and if carried-over with the recovered fiber they will either end up as "dirt spots" on the paper sheets or stick onto the wires, felts, or other paper making equipment which commonly requires the shutting down of such equipment in order to remove the stickies by solvent washing techniques. Other chemical and non-chemical methods for removing or reducing stickie contamination are well known in the art. Removal of these entities can be facilitated using the embodiments of this invention.

Ink formulations used in the printing industry typically include a water-based ink, an oil-based ink, packaging ink, flexo ink, ink-jet ink, pigment-based ink-jet ink, thermal ink-jet ink, or piezoelectric ink-jet ink. These ink formulations, however, have become more and more complex and involve increasingly the use of a wide variety of synthetic resins and polymers. Further, increasing amounts of xerographic copy paper are being used each year, and increasing amounts of impact and non-impact waste paper (i.e., ink jet and laser printed computer paper) are being recycled. Such paper, together with newsprint and magazines, make up the principal sources for recycled waste paper. Furthermore, multicolored printing and multicolored advertisements have become increasingly important in recent years and these advertisements use a wide variety of new ink formulations—many of which incorporate atypical pigments, dyes, and toners. In one preferred embodiment, the printed waste paper comprises a water-based ink, an oil-based ink, packaging ink, flexo ink, ink-jet ink, pigment-based ink-jet ink, thermal ink-jet ink, or piezoelectric ink-jet ink. In an alternate embodiment, the printed waste paper comprises a hydrophilic ink.

In another embodiment, the present invention provides a method of preparing a deinking additive comprising providing from about 1 to about 40 weight parts calcium carbonate in a powder, cake, or slurry; providing about 1 weight part of a deinking composition comprising a nonionic surfactant, a fatty acid, or a mixture thereof; and mixing said calcium carbonate and said deinking composition to obtain said deinking additive.

The present invention will now be further described by the following non-limiting Examples, which demonstrate embodiments of the invention. Those of skill in the art should, in light of the present disclosure, appreciate that many other embodiments are possible without departing from the scope of the invention.

EXAMPLES

In the following examples, newsprint and magazine were received from various geographic locations and mills. Several different waste paper sources were utilized throughout this extensive study. The details of the experimental procedure and testing are noted in a summary table prior to each furnish change. These summary tables include the ratio of old newsprint/old magazines ("ONP/OMG").

Pulping was accomplished by introducing 750 total dry grams of newsprint and magazine in a ONP/OMG ratio to form a 19% pulping consistency. Pulping occurred at the prescribed temperature and hardness. The pulping time was 5 minutes at setting #3 on the Hobart—which corresponds to about 8 kWh/ton energy density. This energy density is representative of a typical commercially utilized drum pulper. Prior to initiating pulping, the standard alkaline deinking components were added. These components include silicate (at 50%), peroxide (at 100%), and caustic (at 50%). The conditions for reduced alkali and neutral deinking are as noted below.

Flotation was performed using the D25 Voith flotation cell as described in the experimental parameter tables for each furnish. Brightness pads (4 gram) were prepared in triplicate from both the feed stock and accept for flotation. ERIC and brightness results were recorded as well as reject volume and mass. All fatty acid was initially prepared as the soap using the procedure received from the mill staff. Hyperwashes were also performed per standard procedures.

The PCC was diluted from 20% to 10% solids in water and a 50% solution of the fatty acid in isopropyl alcohol was poured in and the slurry shaken or mixed under relatively low shear in a Waring Blender. In the case of the phosphate esters, all of which were exceedingly acidic, the esters were mixed with isopropyl alcohol at 25% and the pH adjusted to about 7 using sodium hydroxide. Earlier attempts at using non-neutralized phosphate ester of fatty acids resulted in a significant fizzing and foaming as the PCC was dissolved in the acidic solutions.

| Type of Modifier | Amount (wt. %) |
| --- | --- |
| TDA Phosphate-monoester 9EO | 6 |
| WV1483 (Fatty acid) | 12 |
| M1P-untreated(Control) | 0 (Control) |
| TDA Phosphate-diester 9EO | 3 |

-continued

| Type of Modifier | Amount (wt. %) |
| --- | --- |
| WV1483 (Fatty acid) | 3 |
| WV1483 (Fatty acid) | 6 |
| Hydrolyzed ASA | 1 |

All values, unless otherwise specified, are in weight percent (wt. %).

Example 1

The ONP/OMG ratio was 4:1. The pulping and flotation occurred at 48° C. Pulping was performed at 19% consistency and a hardness of 180 ppm with 30#/t of caustic, 25#/t of silicate, and 3#/t of peroxide in the pulper. Flotation was performed for 6 minutes at a starting consistency of 1% in a Voith cell.

| | Program | | | | | | | |
| --- | --- | --- | --- | --- | --- | --- | --- | --- |
| | Float Feed | | Float Accept | | Float Reject | | H.W. | |
| | Bright | ERIC | Bright | ERIC | Wet | Dry | Bright | ERIC |
| 3# LS 5140 (Pulper) | 40.1 | 1317 | 50.5 | 512 | 1750 | 26 | 56.5 | 183 |
| 3# LS 5140 (Pulper)/ 20#/t MIP-untreated | 41.5 | 1216 | 53.7 | 347 | 1860 | 28 | 58.2 | 133 |
| 3# LS 5140 (Pulper)/ 20#/t MIP-TDA Phosphate-diester 9EO (3 wt. %) | 42.5 | 1125 | 53.8 | 331 | 1577 | 25 | 57.8 | 134 |
| 3# LS 5140 (Pulper)/ 20#/t MIP-WV1483 (fatty acid) (3 wt. %) | 42.0 | 1158 | 54.0 | 319 | 1800 | 28 | 57.6 | 138 |
| 3# LS 5140 (Pulper)/ 20#/t MIP-WV1483 (fatty acid) (6 wt. %) | 41.7 | 1182 | 52.5 | 388 | 1638 | 25 | 57.0 | 148 |
| 3# LS 5140 (Pulper)/ 20#/t MIP-Hydrolyzed ASA (1 wt. %) | 41.8 | 1169 | 54.6 | 313 | 1820 | — | 58.2 | 133 |

The MIP technology demonstrates very notable deinking collection improvements. All of the MIP evaluated performed favorably. These dramatic improvements in both brightness and ERIC values were often achieved at the same or lower reject levels thereby indicating improved collection efficiency. The hyperwash ERIC results clearly show that the MIP technology demonstrates significant improvements in ink that is detached from the fiber. MIP-untreated, an untreated PCC, also demonstrates improved deinking performance in the presence of the surfactant blend.

Example 2

The ONP/OMG ratio was 4:1. The pulping and flotation occurred at 113° F. Pulping was performed at 19% consistency and a hardness of 120 ppm with 32#/t of caustic, 15#/t of silicate, and 18#/t of peroxide in the pulper. Flotation was performed for 6 minutes at a starting consistency of 1% in a Voith cell. These tests were performed in order to examine what, if any, contribution the addition of untreated MIP ("MIP-untreated") has on the pulp brightness. The addition of MIP-untreated in the absence of a deinking aid demonstrates that a synergistic non-additive benefit is obtained when the MIP is introduced in tandem with the surfactant blend.

|  | Program | | | | | | | |
|---|---|---|---|---|---|---|---|---|
|  | Float Feed | | Float Accept | | Float Reject | | H.W. | |
|  | Bright | ERIC | Bright | ERIC | Wet | Dry | Bright | ERIC |
| 20#/t MIP-untreated | 41.0 | 1251 | 48.8 | 588 | 2013 | 26 | 56.2 | 189 |
| No additives | 40.3 | 1292 | 49.2 | 601 | 2058 | 25 | 56.2 | 191 |

Example 3

The ONP/OMG ratio was 4:1. The pulping and flotation occurred at 48° C. Pulping was performed at 19% consistency and a hardness of 180 ppm with 30#/t of caustic, 25#/t of silicate, and 3#/t of peroxide in the pulper. Flotation was performed for 6 minutes at a starting consistency of 1% in a Voith cell. The favorable impact of the MIP in the presence of different surfactant blends is observed. Significant improvements in brightness, ERIC, and in hyperwash are also observed.

|  | Program | | | | | | | |
|---|---|---|---|---|---|---|---|---|
|  | Float Feed | | Float Accept | | Float Reject | | H.W. | |
|  | Bright | ERIC | Bright | ERIC | Wet | Dry | Bright | ERIC |
| 3# LS 664 (Pulper) | 42.7 | 1114 | 49.1 | 617 | 1260 | 17 | 57.5 | 173 |
| 3# LS 664 (Pulper)/ 20#/t MIP-TDA Phosphate-monoester 9EO (6 wt. %) | 44.6 | 966 | 54.8 | 321 | 1615 | 23 | 58.5 | 121 |
| 3# LS 664 (Pulper)/ 20#/t MIP-Hydrolyzed ASA (1 wt. %) | 41.5 | 1229 | 53.4 | 368 | 1983 | — | 58.0 | 145 |
| 3# LS 710 (Pulper)/ 20#/t MIP-untreated | 42.3 | 1137 | 54.2 | 333 | 1589 | 24 | 58.1 | 134 |

Example 4

The ONP/OMG ratio was 4:1. The pulping and flotation occurred at 48° C. Pulping was performed at 19% consistency and a hardness of 180 ppm with 30#/t of caustic, 25#/t of silicate, and 3#/t of peroxide in the pulper. Flotation was performed for 6 minutes at a starting consistency of 1% in a Voith cell. This example demonstrates that a hydrophobically-MIP provides a synergistic and non-additive benefit in flotation and washing deinking processes when the deinking composition contains a mixture of fatty acids and nonionic surfactants in specific ratios.

|  | Program | | | | | | | |
|---|---|---|---|---|---|---|---|---|
|  | Float Feed | | Float Accept | | Float Reject | | H.W. | |
|  | Bright | ERIC | Bright | ERIC | Wet | Dry | Bright | ERIC |
| 2.55# LS 737 (Pulper)/ 20#/t MIP-untreated | 41.1 | 1265 | 50.7 | 493 | 1947 | 27 | 56.5 | 190 |
| 2.55# LS 737 (Pulper)/ 20#/t MIP-TDA Phosphate-monoester 9EO (6 wt. %) | 44.6 | 966 | 54.8 | 321 | 1615 | 23 | 58.5 | 121 |
| 3# WV1483 (Fatty acid- 6 wt %)) (Pulper)/ 20#/t MIP-untreated | 41.7 | 1185 | 50.2 | 522 | 2024 | 25 | 56.1 | 167 |

Example 5

The ONP/OMG ratio was 4:1. The pulping and flotation occurred at 48° C. Pulping was performed at 19% consistency and a hardness of 180 ppm with 30#/t of caustic, 25#/t of silicate, and 3#/t of peroxide in the pulper. Flotation was performed for 6 minutes at a starting consistency of 1% in a Voith cell. These results show that increasing the MIP to surfactant blend ratio can increase the deinking performance with regard to accept quality and collection efficiency.

| | Program | | | | | | | |
|---|---|---|---|---|---|---|---|---|
| | Float Feed | | Float Accept | | Float Reject | | H.W. | |
| | Bright | ERIC | Bright | ERIC | Wet | Dry | Bright | ERIC |
| 3# LS 710 (Pulper)/ 10#/t MIP-untreated | 43.0 | 1101 | 54.4 | 316 | 1660 | 27 | 58.0 | 127 |
| 3# LS 710 (Pulper)/ 20#/t MIP-untreated | 43.3 | 1070 | 55.2 | 283 | 1470 | 27 | 57.3 | 122 |
| 3# LS 710 (Pulper)/ 30#/t MIP-untreated | 43.3 | 1076 | 55.8 | 250 | 1545 | 28 | 58.5 | 113 |

Example 6

The ONP/OMG ratio was 4:1. The pulping and flotation occurred at 48° C. Pulping was performed at 19% consistency and a hardness of 180 ppm with 30#/t of caustic, 25#/t of silicate, and 3#/t of peroxide in the pulper. Flotation was performed for 6 minutes at a starting consistency of 1% in a Voith cell. This example demonstrates that a hydrophobically-MIP ("MIP-TDA Phosphate-monoester 9EO") provides a synergistic and non-additive benefit in flotation and washing deinking processes when the deinking composition contains a mixture of fatty acids and nonionic surfactants in specific ratios.

| | Program | | | | | | |
|---|---|---|---|---|---|---|---|
| | Float Feed | | Float Accept | | Float Reject | H.W. | |
| | Bright | ERIC | Bright | ERIC | Wet | Bright | ERIC |
| 2.55# LS 747 (Pulper)/ 20#/t MIP-untreated | 42.4 | 1154 | 50.5 | 512 | 1086 | 56.8 | 163 |
| 2.55# LS 747 (Pulper)/ 20#/t MIP-TDA Phosphate-monoester 9EO (6 wt. %) | 43.9 | 1040 | 54.7 | 305 | 1420 | 58.8 | 127 |
| 2.55# LS 777 (Pulper)/ 20#/t MIP-untreated | 41.7 | 1228 | 50.7 | 489 | 1728 | 56 | 178 |
| 2.55# LS 777 (Pulper)/ 20#/t MIP-TDA Phosphate-monoester 9EO (6 wt. %) | 43.6 | 1051 | 55.1 | 283 | 1860 | 57.85 | 128 |
| 2.55# LS 787 (Pulper)/ 20#/t MIP-untreated | 43.0 | 1112 | 51.5 | 468 | 1515 | 57.17 | 159 |
| 2.55# LS 787 (Pulper)/ 20#/t MIP-TDA Phosphate-monoester 9EO (6 wt. %) | 43.3 | 1087 | 54.7 | 306 | 1660 | 57.87 | 124 |

Example 7

The ONP/OMG ratio was 4:1. The pulping and flotation occurred at 113° F. Pulping was performed at 19% consistency and a hardness of 120 ppm with no additives other than those described in the summary table. This example is a series of reduced low alkali deinking evaluations. Flotation was performed for 6 minutes at a starting consistency of 1% in a Voith cell. The results show that the similar ERIC, highly indicative of ink removal, can be obtained with a combination of silicate and sulfite for the two different MIP technologies examined. Brightness is less favorable due to the elimination of the peroxide bleaching component present under alkaline deinking.

| Program | Float Feed | | Float Accept | | Float Reject | H.W. | |
|---|---|---|---|---|---|---|---|
| Reduced Alkali Evaluation | Bright | ERIC | Bright | ERIC | Wet | Bright | ERIC |
| 3# LS 664 (Pulper)/ 20#/t MIP-untreated | | | | | | | |
| Alkaline | 44.0 | 1036 | 51.0 | 517 | 1497 | 55.8 | 217 |
| Reduced Alkali 25# Silicate | 42.1 | 1071 | 47.0 | 585 | 1640 | 51.3 | 235 |
| Reduced Alkali 25# Silicate and 20# Sulfite | 43.0 | 1039 | 49.3 | 520 | 1400 | 53.04 | 219 |
| 3# LS 664 (Pulper)/ 20#/t MIP-TDA Phosphate-monoester 9EO (6 wt. %) | | | | | | | |
| Alkaline | 44.0 | 1032 | 51.8 | 479 | 1726 | 55.51 | 213 |
| Reduced Alkali 25# Silicate | 42.1 | 1063 | 47.7 | 535 | 1934 | 51.05 | 226 |
| Reduced Alkali 25# Silicate and 20# Sulfite | 42.9 | 1041 | 49.1 | 490 | 1642 | 52.06 | 224 |

Example 8

The ONP/OMG ratio was 4:1. The pulping and flotation occurred at 113° F. Pulping was performed at 19% consistency and a hardness of 120 ppm with 32 #/t of caustic, 15 #/t of silicate, and 18 #/t of peroxide in the pulper. Flotation was performed for 6 minutes at a starting consistency of 1% in a Voith cell. The results show that the MIP technology performs favorably using a two micron treated ground calcium carbonate ("GCC-2") as the MIP.

| | Program | | | | | | | |
|---|---|---|---|---|---|---|---|---|
| | Float Feed | | Float Accept | | Float Reject | | H.W. | |
| | Bright | ERIC | Bright | ERIC | Wet | Dry | Bright | ERIC |
| 3# LS 664 (Pulper) | 42.3 | 1245 | 51.9 | 488 | 858 | 18.0 | 60 | 108 |
| 3# LS 664 (Pulper)/20# GCC-2 (2 µm treated) | 43.7 | 1122 | 53.7 | 371 | 997 | 21 | 59.9 | 109 |

Example 9

The ONP/OMG ratio was 4:1. The pulping and flotation occurred at 113° F. Pulping was performed at 19% consistency and a hardness of 120 ppm with 32 #/t of caustic, 15 #/t of silicate, and 18 #/t of peroxide in the pulper. Flotation was performed for 6 minutes at a starting consistency of 1% in a Voith cell. The results show that the MIP technology performs extremely well when the surfactant blend and the MIP are mixed prior to introduction into the pulper ("PREMIX").

|  | Program | | | | | | | |
|---|---|---|---|---|---|---|---|---|
|  | Float Feed | | Float Accept | | Float Reject | | H.W. | |
|  | Bright | ERIC | Bright | ERIC | Wet | Dry | Bright | ERIC |
| 3# LS 664 (Pulper) | 42.3 | 1245 | 51.9 | 488 | 858 | 18.0 | 60 | 108 |
| 3# LS 664 (Pulper)/ 20#/t MIP-untreated | 43.3 | 1189 | 52.8 | 449 | 1318 | 21.0 | 60 | 103 |
| 3# LS 664 (Pulper)/ 20#/t MIP-untreated PREMIX | 42.8 | 1173 | 55.6 | 273 | 1240 | 25 | 59.7 | 96 |

Example 10

The ONP/OMG ratio was 4:1. The pulping and flotation occurred at 113° F. Pulping was performed at 19% consistency and a hardness of 120 ppm with 32#/t of caustic, 15#/t of silicate, and 18#/t of peroxide in the pulper. Flotation was performed for 6 minutes at a starting consistency of 1% in a Voith cell. This example demonstrates the performance of the invention under neutral deinking conditions. In summary, the accepts ERIC, collection efficiency, and hyperwash data are favorable. The lag in brightness is the result of the elimination of the pulper peroxide in the alkaline control and the associated brightness gain.

| Program | Float Feed | | Float Accept | | Float Reject | | H.W. | |
|---|---|---|---|---|---|---|---|---|
| Neutral | Bright | ERIC | Bright | ERIC | Wet | Dry | Bright | ERIC |
| 3# LS 664 (Pulper)/ 20#/t MIP-untreated PREMIX | 40.8 | 1232 | 51.0 | 368 | 1098 | 25.0 | 55.18 | 110 |
| 3# LS 664 (Pulper)/ 30#/t MIP-untreated PREMIX | 40.6 | 1269 | 51.5 | 312 | 1457 | 29.0 | 54.96 | 112 |
| 4.5# LS 664 (Pulper)/ 30#/t MIP-untreated PREMIX | 40.3 | 1274 | 51.8 | 300 | 1247 | 27.0 | 54.71 | 106 |
| 4.5# LS 664 (Pulper)/ 30#/t MIP-untreated PREMIX + 25#/t Silicate | 41.7 | 1146 | 51.8 | 284 | 1151 | 27.0 | 54.87 | 104 |
| 4.5# LS 664 (Pulper)/ 30#/t MIP-untreated PREMIX + 25#/t Silicate + 0.4#/t 737 (Fatty Acid) (Added prior to floatation) | 41.7 | 1146 | 52.3 | 255 | 1332 | 28.0 | 55.05 | 101 |
| 4.5# LS 610 (Pulper)/ 30#/t MIP-untreated PREMIX + 25#/t Silicate | 41.2 | 1189.2 | 52.0 | 254 | 1234.0 | 25.0 | 55.01 | 97 |
| 4.5# LS 610 (Pulper)/ 30#/t MIP-untreated PREMIX + 25#/t Silicate + 0.4#/t 737 (Fatty Acid) (Added prior to floatation) | 41.2 | 1189.2 | 52.4 | 256.6 | 1150.0 | 24.0 | 55.57 | 104 |

It is understood that upon reading the above description of the present invention, one skilled in the art could make changes and variations therefrom. These changes and variations are included in the spirit and scope of the following appended non-limiting claims.

We claim:

1. A method of deinking printed waste paper that comprises ink and paper pulp, comprising:

a) converting the printed waste paper to an aqueous pulp slurry in a pulper;

b) contacting said aqueous pulp slurry with a premixed deinking additive comprising an aqueous dispersible hydrophobically modified inorganic particle which comprises a contact product of mixing calcium carbonate, wherein the calcium carbonate is in a ratio with a deinking composition ranging from 1:1 to 40:1, wherein the deinking composition comprises a fatty acid, and a nonionic surfactant, wherein the nonionic surfactant comprises a fatty alcohol comprising from 5 to 100 moles of alkoxylation, wherein the deinking composition is provided in an amount from 2 pounds/ton to 25 pounds/ton based on the weight of the printed waste paper;

c) separating said ink in the aqueous pulp slurry; and
d) recovering deinked paper pulp from the aqueous pulp slurry.

2. The method of claim 1 wherein said calcium carbonate comprises precipitated calcium carbonate.

3. The method of claim 1 wherein said calcium carbonate comprises ground calcium carbonate.

4. The method of claim 1 wherein said calcium carbonate comprises particles having an average particle diameter of from about 0.1 microns to about 10 microns ($\mu$m).

5. The method of claim 1 wherein said calcium carbonate is provided as a powder, cake, or an aqueous slurry.

6. The method of claim 1 wherein said calcium carbonate is provided substantially in the absence of any dispersants.

7. The method of claim 1 wherein said fatty acid has a carbon chain length of from about 6 to about 22.

8. The method of claim 1 wherein said fatty acid is saturated.

9. The method of claim 1 wherein said fatty acid comprises from 1 to 5 degrees of ethylenic unsaturation.

10. The method of claim 1 wherein said fatty acid is derived from palm, tall, vegetable, or tallow oils.

11. The method of claim 1 wherein said nonionic surfactant comprises a hydrocarbon which is propoxylated and ethoxylated.

12. The method of claim 1 wherein said nonionic surfactant is ethoxylated.

13. The method of claim 1 wherein said nonionic surfactant comprises a first nonionic surfactant that is ethoxylated and a second nonionic surfactant that is ethoxylated and propoxylated.

14. The method of claim 1 wherein said calcium carbonate is provided in an amount of from about 1 pound/ton to about 75 pounds/ton based on the weight of said printed waste paper.

15. The method of claim 1 wherein said calcium carbonate is provided in an amount of from about 5 pounds/ton to about 40 pounds/ton based on the weight of said printed waste paper.

16. The method of claim 1 wherein said recovering step (d) comprises a flotation step, a washing step, or a combination thereof.

17. The method of claim 1 wherein said aqueous slurry further comprises one or more of the following:
   a) from about 0 to about 40 pounds of caustic or soda ash per ton of printed waste paper,
   b) from about 0.5 to about 20 pounds of nonionic surfactant and/or fatty acid per ton of printed waste paper;
   c) from about 0 to about 6 pounds of a chelant per ton of printed waste paper;
   d) from about 0 to about 40 pounds of a peroxide per ton of printed waste paper; or
   e) from about 0 to about 45 pounds of silicate per ton of printed waste paper.

18. The method of claim 1 wherein said aqueous pulp slurry does not contain dispersants.

* * * * *

UNITED STATES PATENT AND TRADEMARK OFFICE
CERTIFICATE OF CORRECTION

PATENT NO. : 7,897,010 B2
APPLICATION NO. : 12/087352
DATED : March 1, 2011
INVENTOR(S) : Scott Rosencrance et al.

It is certified that error appears in the above-identified patent and that said Letters Patent is hereby corrected as shown below:

Col. 5, lines 14-15; "Journal of the Society of Cosmetic Chemists" should read "*Journal of the Society of Cosmetic Chemists*";

Col. 21, lines 55-56; Example 10, 5th entry, "(Added prior to floatation)" should read "(Added prior to flotation)"; and Col. 21, lines 64-65; Example 10, 7th entry, "(Added prior to floatation)" should read "(Added prior to flotation)".

Signed and Sealed this
Nineteenth Day of April, 2011

David J. Kappos
*Director of the United States Patent and Trademark Office*